United States Patent
Chen et al.

(10) Patent No.: US 10,286,742 B2
(45) Date of Patent: May 14, 2019

(54) REINFORCEMENT PLATE FOR AN AUXILIARY STATE LEAF PACK OF A LEAF SPRING SYSTEM

(71) Applicant: GM GLOBAL TECHNOLOGY OPERATIONS LLC, Detroit, MI (US)

(72) Inventors: Jian Chen, West Bloomfield, MI (US); Oleg G. Basin, Franklin, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 15 days.

(21) Appl. No.: 15/620,080

(22) Filed: Jun. 12, 2017

(65) Prior Publication Data

US 2018/0354331 A1 Dec. 13, 2018

(51) Int. Cl.
  *F16F 1/30* (2006.01)
  *F16F 3/02* (2006.01)
  *B60G 11/04* (2006.01)

(52) U.S. Cl.
  CPC ............ *B60G 11/04* (2013.01); *F16F 1/30* (2013.01); *F16F 3/023* (2013.01); *B60G 2204/121* (2013.01)

(58) Field of Classification Search
  CPC ...... F16F 1/30; F16F 1/18; F16F 1/182; F16F 1/20; F16F 3/023; F16F 2238/022; B60G 11/04; B60G 3/16; B60G 17/023; B60G 2202/112; B60G 2206/428; B60G 2204/121
  See application file for complete search history.

(56) References Cited

U.S. PATENT DOCUMENTS

| | | | | | |
|---|---|---|---|---|---|
| 1,326,107 A | * | 12/1919 | Seaton | ............... | B60G 11/04 267/41 |
| 1,413,451 A | * | 4/1922 | Arnot | ............... | B60G 11/04 267/242 |
| 1,595,411 A | * | 8/1926 | Lord | ............... | F16F 1/30 264/261 |
| 1,660,892 A | * | 2/1928 | Shepley | ............... | B60G 11/04 267/47 |

(Continued)

FOREIGN PATENT DOCUMENTS

| | | | | | |
|---|---|---|---|---|---|
| JP | 55086935 A | * | 7/1980 | ............... | F16F 1/18 |
| JP | 56080536 A | * | 7/1981 | ............... | F16F 1/30 |

(Continued)

*Primary Examiner* — Laura Freedman
(74) *Attorney, Agent, or Firm* — Cantor Colburn LLP

(57) ABSTRACT

A leaf spring system includes a main leaf pack having a main leaf spring including a first end, a second and a first surface and a second opposing surfaces extending therebetween. An auxiliary stage leaf pack is arranged at the first. The auxiliary stage leaf pack includes a first surface portion and a second, opposing surface portion. A spacer is arranged between the first surface of the main leaf spring and the second surface portion of the auxiliary stage leaf pack. The spacer includes first axial end, a second axial end. A reinforcement plate is arranged at the first surface portion of the auxiliary stage leaf pack substantially aligned with the spacer. The reinforcement plate includes a first end section, a second end section. At least one of the first end section and the second end section extends beyond a corresponding one of the first and second axial ends.

15 Claims, 3 Drawing Sheets

(56) References Cited

U.S. PATENT DOCUMENTS

| | | | | |
|---|---|---|---|---|
| 2,264,174 | A * | 11/1941 | Crump | B60G 11/04 267/66 |
| 3,493,222 | A * | 2/1970 | Mathers | B60G 11/04 267/270 |
| 8,143,766 | B2 * | 3/2012 | Namuduri | B60G 11/04 310/339 |
| 9,969,229 | B2 * | 5/2018 | Soles | B60G 11/10 |
| 2014/0048988 | A1 * | 2/2014 | Soles | B60G 11/04 267/36.1 |
| 2016/0159183 | A1 * | 6/2016 | Basin | B60G 13/04 280/124.108 |
| 2017/0313149 | A1 * | 11/2017 | Chihara | B21D 19/00 |
| 2018/0141573 | A1 * | 5/2018 | Tsumura | B61F 5/30 |

FOREIGN PATENT DOCUMENTS

| | | | | |
|---|---|---|---|---|
| JP | 2016223602 | A * | 12/2016 | B61F 5/30 |
| WO | WO-9200202 | A1 * | 1/1992 | B60G 11/113 |

* cited by examiner

REINFORCEMENT PLATE FOR AN AUXILIARY STATE LEAF PACK OF A LEAF SPRING SYSTEM

INTRODUCTION

The subject disclosure relates to the art of vehicles and, more particularly, to a reinforcement plate for an auxiliary leaf system of a leaf spring system.

Many wheeled vehicles include systems that absorb vibrations and accommodate vehicle loads. For example, a wheeled vehicle may include a leaf spring system that supports and sets a desired position of a vehicle axle. The leaf spring also bends and flexes in response to road conditions. Bending and flexing of the leaf spring reduces shocks and/or vibrations that may be perceived by a passenger. In operation, leaf springs are exposed to vibrations which may, over time, lead to component fatigue.

Vehicles that carry heavy loads may include an auxiliary leaf assembly having an auxiliary stage leaf pack coupled to the leaf spring system. The auxiliary stage leaf pack works with the leaf spring system to support heavier weights. The auxiliary stage leaf pack is prone to higher levels of vibration and associated noise. The higher levels of vibration lead to a need for more frequent inspection and/or replacement. Accordingly, it is desirable to provide a system that reduces the effects of vibration stress and also reduces noise generated by interactions between the wheeled vehicle and a road for an auxiliary stage leaf pack of a leaf spring system.

SUMMARY

In accordance with an exemplary aspect, a leaf spring system includes a main leaf pack having a main leaf spring including a first end provided with a first attachment member, a second end provided with a second attachment member and an intermediate portion including first surface and a second opposing surface extending therebetween. An auxiliary stage leaf pack is arranged at the first surface of the main leaf spring. The auxiliary stage leaf pack includes a first surface portion and a second, opposing surface portion. A spacer is arranged between the first surface of the main leaf spring and the second surface portion of the auxiliary stage leaf pack. The spacer includes first axial end, a second axial end and a central axis. A reinforcement plate is arranged at the first surface portion of the auxiliary stage leaf pack substantially aligned with the spacer. The reinforcement plate includes a first end section, a second end section, and an intermediate section extending therebetween. At least one of the first end section and the second end section extends beyond a corresponding one of the first axial end and the second axial end.

In addition to one or more of the features described above or below, or as an alternative, further embodiments could include a tip insert positioned between the one of the first end section and the second end section extending beyond a corresponding one of the first axial end and the second axial end and the first surface of the auxiliary stage leaf pack.

In addition to one or more of the features described above or below, or as an alternative, further embodiments could include wherein the tip insert is formed from a non-metallic material.

In addition to one or more of the features described above or below, or as an alternative, further embodiments could include wherein the non-metallic material comprises at least one of an elastomer and a plastic.

In addition to one or more of the features described above or below, or as an alternative, further embodiments could include wherein each of the first end section and the second end section extend beyond a corresponding one of the first axial end and the second axial end.

In addition to one or more of the features described above or below, or as an alternative, further embodiments could include a spacer element arranged between the intermediate section of the reinforcement plate and the first surface of the auxiliary stage leaf pack.

In addition to one or more of the features described above or below, or as an alternative, further embodiments could include wherein the reinforcement plate includes a pre-load.

In addition to one or more of the features described above or below, or as an alternative, further embodiments could include wherein the reinforcement plate is formed from a metallic material.

In accordance with another exemplary aspect, a vehicle includes a frame, and a leaf spring system mounted to the frame. The leaf spring system includes a main leaf pack including a main leaf spring having a first end provided with a first attachment member, a second end provided with a second attachment member and an intermediate portion including first surface and a second opposing surface extending therebetween. An auxiliary stage leaf pack is arranged at the first surface of the main leaf spring. The auxiliary stage leaf pack includes a first surface portion and a second, opposing surface portion. A spacer is arranged between the first surface of the main leaf spring and the second surface portion of the auxiliary stage leaf pack. The spacer includes a first axial end and a second axial end. A reinforcement plate is arranged at the first surface of the auxiliary stage leaf pack substantially aligned with the spacer. The reinforcement plate includes a first end section, a second end section, and an intermediate section extending therebetween. At least one of the first end section and the second end section extends beyond a corresponding one of the first axial end and the second axial end.

In addition to one or more of the features described above or below, or as an alternative, further embodiments could include a tip insert positioned between the one of the first end section and the second end section extending beyond a corresponding one of the first axial end and the second axial end and the first surface of the auxiliary stage leaf pack.

In addition to one or more of the features described above or below, or as an alternative, further embodiments could include wherein the tip insert is formed from a non-metallic material.

In addition to one or more of the features described above or below, or as an alternative, further embodiments could include wherein the non-metallic material comprises at least one of an elastomer and a plastic.

In addition to one or more of the features described above or below, or as an alternative, further embodiments could include wherein each of the first end section and the second end section extend beyond a corresponding one of the first axial end and the second axial end.

In addition to one or more of the features described above or below, or as an alternative, further embodiments could include a spacer element arranged between the intermediate section of the reinforcement plate and the first surface of the auxiliary stage leaf pack.

In addition to one or more of the features described above or below, or as an alternative, further embodiments could include wherein the reinforcement plate includes a pre-load.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
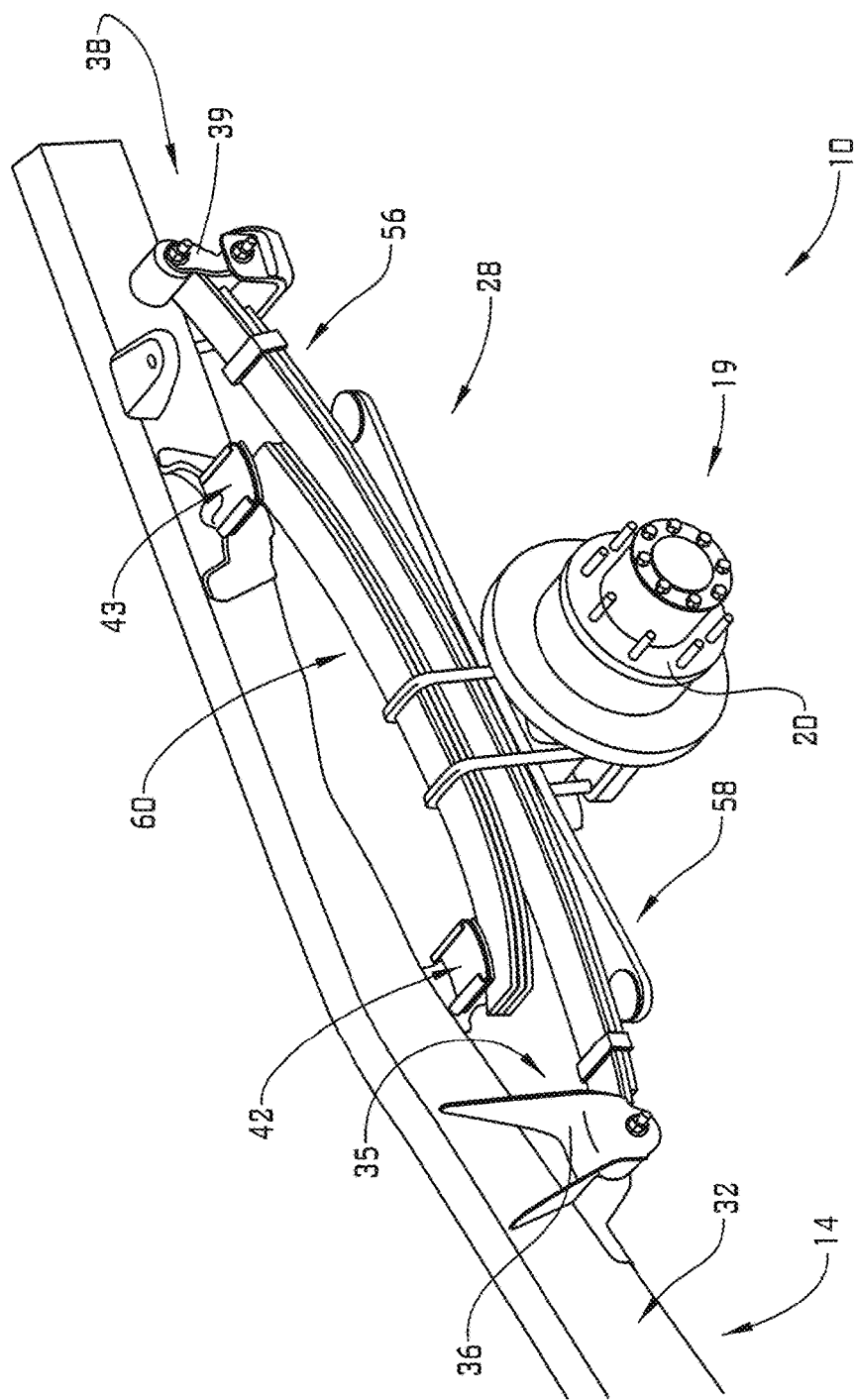
FIG. 1 is partial side view of a vehicle including a leaf spring system having a reinforcement plate, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. It is to be understood that vehicle 10 may take on a variety of forms including powered vehicles such as trucks, pick-up trucks, and towed vehicles. Vehicle 10 includes a frame 14 that supports a body (not shown) and an axle assembly 19. Axle assembly 19 includes a hub 20 that is rotatably connected to a pair of wheels (also not shown). Axle assembly 19 is mechanically connected to frame 14 by a leaf spring system 28. While only showing a single leaf spring system, it is to be understood that axle assembly 19 is also supported by a second leaf spring system (not shown).

Frame 14 includes a plurality of frame rails, one of which is indicated at 32. Frame rail 32 includes a forward leaf spring system support bracket 35 including a forward shackle 36 and an aft leaf spring system support bracket 38 including an aft shackle 39. Frame rail 32 may also support a first or forward reaction bracket 42 and a second or aft reaction bracket 43. Forward and aft reaction brackets 42, 43 limit upward movement of leaf spring system 28 when subjected to negative camber bending.

Figure 2:
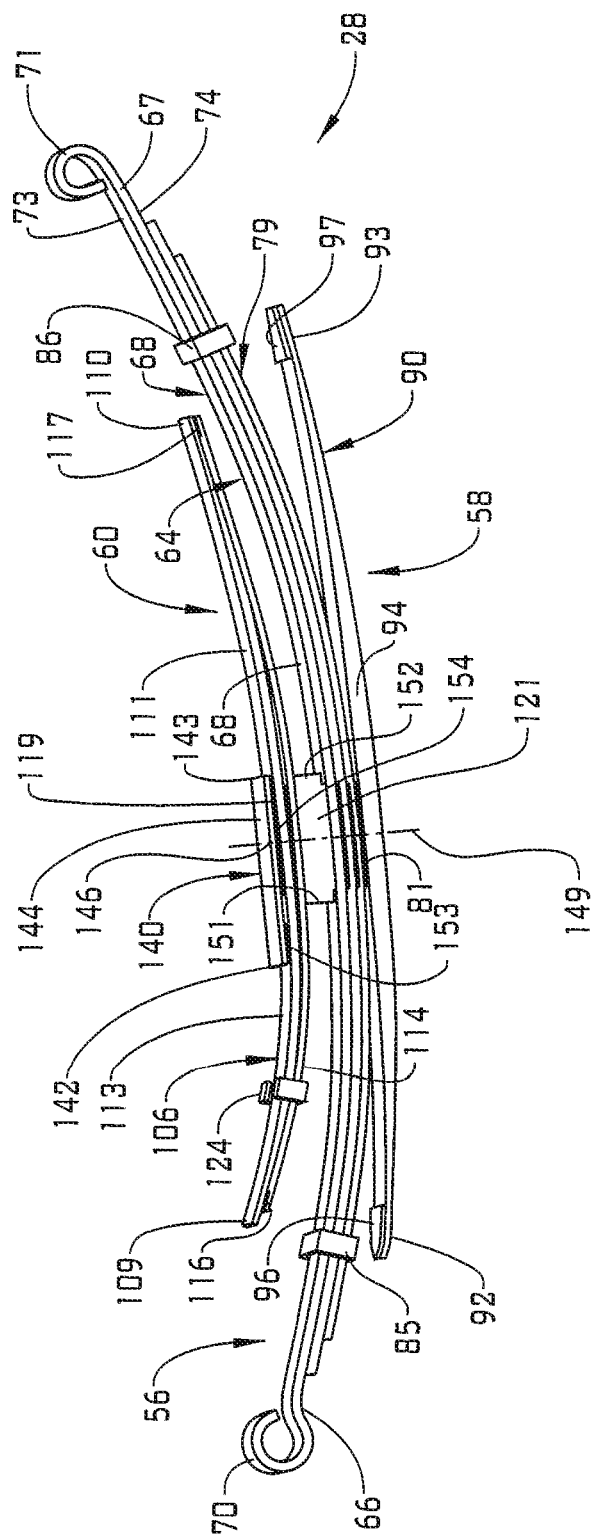
FIG. 2 depicts the leaf spring system of FIG. 1.

As best shown in FIG. 2, leaf spring system 28 includes a main leaf pack 56, that may also include a second stage leaf pack 58 and an auxiliary stage leaf pack 60. Second stage leaf pack 58 and auxiliary stage leaf pack 60 may be employed to support heavier loading of leaf spring system 28 as well as provide selected response forces in reaction to irregularities in driving surfaces. Main leaf pack 56 includes a main leaf spring 64 having a first end 66, a second end 67 and an intermediate portion 68, extending therebetween.

First end 66 includes a first attachment member 70 and second end 67 includes a second attachment member 71. First attachment member 70 connects leaf spring system 28 to forward leaf spring system support bracket 35 and second attachment member 71 connects leaf spring system 28 to aft leaf spring system support bracket 38. Main leaf spring 64 includes a first surface 73 and an opposing second surface 74. Main leaf pack 56 may also include additional leaf members indicated generally at 79 as well as spacers, one of which is indicated at 81, arranged between adjacent leaf members. as well as tip inserts (not separately labeled) at ends of each additional leaf member. Spacers 81 and the tip inserts mitigate leaf-to-leaf contact that may result in wear and/or localized fatiguing. Main leaf spring 64 and additional leaf members 79 are joined by a first shackle element 85 and a second shackle element 86. Main leaf spring 64 and additional leaf members 79 may be formed from a metallic material while spacers 81 may be formed from a non-metallic material such as an elastomer or hard plastic.

In the exemplary embodiment shown, second stage leaf pack 58 includes one or more second stage leaf members one of which is indicated at 90. Second stage leaf member 90 includes a first end portion 92, a second end portion 93, and an intermediate zone 94. A first tip insert 96 may be arranged at first end portion 92 and a second tip insert 97 may be arranged at second end portion 93. In addition, a spacer (not separately labeled) may be arranged between second stage leaf member 90 and main leaf pack 56. Tip inserts 96, 97 and the spacers mitigate leaf-to-leaf contact that may result in wear and/or localized fatiguing. Second stage leaf member 90 may be formed from a metallic material while the spacer may be formed from a non-metallic material such as an elastomer or hard plastic.

Auxiliary stage leaf pack 60 includes one or more auxiliary leaf members indicated at 106. Auxiliary leaf members 106 include a first end segment 109, a second end segment 110 and an intermediate segment 111. Auxiliary leaf members 106 also include a first surface portion 113 and a second, opposing surface portion 114. One or more first tip insert elements 116 may be arranged between adjacent ones of auxiliary leaf member 106 at first end segment 109. Likewise, one or more second tip insert elements 117 may be arranged between adjacent ones of auxiliary leaf members 106 at second end segment 110.

Additionally, one or more spacer elements 119 may be arranged between adjacent ones of auxiliary leaf member 106 at intermediate segment 111. A spacer member 121 is arranged between main leaf pack 56 and auxiliary stage leaf pack 60. Tip inserts 116, 117, spacer elements 119, and spacer member 121 mitigate leaf-to-leaf contact that may result in wear and/or localized fatiguing. A shackle member 124 may be employed to join auxiliary leaf members 106. Auxiliary leaf members 106 may be formed from a metallic material while spacer elements 119 and spacer member 121 may be formed from a non-metallic material such as an elastomer or hard plastic.

Figure 3:
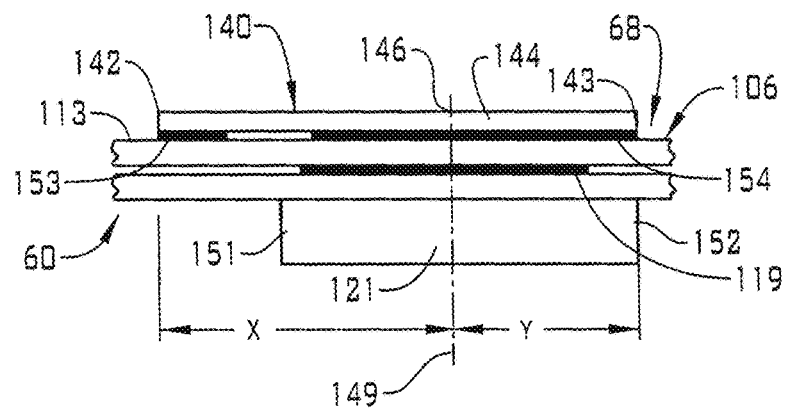
FIG. 3 depicts the leaf spring system having a reinforcement plate, in accordance with another aspect of an exemplary embodiment.

In accordance with an aspect of an exemplary embodiment, leaf spring system 28 includes a reinforcement plate 140 arranged on first surface portion 113 substantially aligned with spacer member 121. More specifically, reinforcement plate 140 includes a first end section 142, a second end section 143 and an intermediate section 144 having a portion 146 substantially aligned with a central axis 149 of spacer member 121. Specifically, spacer member 121 includes a first axial end 151 and a second axial end 152. Central axis 149 extends centrally between first and second axial ends 151, 152. As best shown in FIG. 3, first end section 142 extends a first distance "X" from portion 146 and second end section 143 extends a second distance "Y" from point 146. In the exemplary embodiment shown, first distance "Y" is greater than second distance "Y". That is, first end section 142 extends beyond first axial end 151 of spacer member 121. In an embodiment, reinforcement plate 140 may be provided with a pre-load or bend.

A tip insert member 153 may be arranged between first end section 142 and auxiliary stage leaf pack 60. Additionally, a spacer 154 may be arranged between reinforcement plate 140 and auxiliary stage leaf pack 60 at intermediate section 144. Reinforcement plate 140 may be formed from a metallic material while tip insert member 153 and spacer 154 may be formed from a non-metallic material such as an elastomer or a hard plastic. Tip insert member 153 and spacer 154 mitigate leaf-to-leaf contact that may result in wear and/or localized fatiguing. In accordance with an exemplary aspect, reinforcement plate 140 may be installed to leaf spring system 28 with a pre-load or bias.

Figure 4:
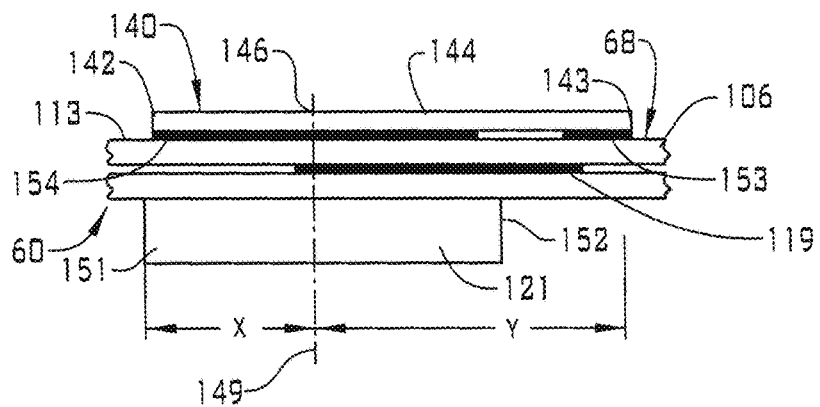
FIG. 4 depicts the leaf spring system having a reinforcement plate, in accordance with yet another aspect of an exemplary embodiment.
Figure 5:
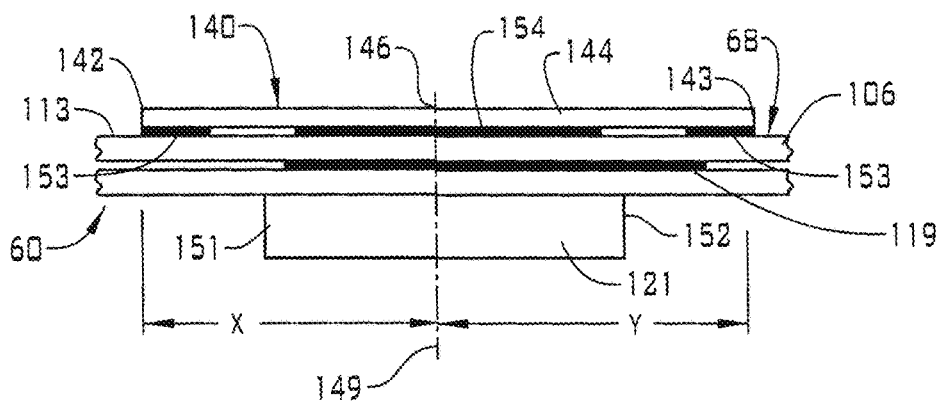
FIG. 5 depicts the leaf spring system having a reinforcement plate, in accordance with still yet another aspect of an exemplary embodiment.

It is to be understood that reinforcement plate 140 provides additional support of positive camber of auxiliary leaf members 106. More specifically, reinforcement plate 140 supports auxiliary stage leaf pack 60 and reduces reverse bending stresses. In this manner, leaf spring system 28 with reinforcement plate 140 may support heavier vibration loads than would be practical for a conventional leaf spring system. Further, it should be understood that reinforcement plate 140 may be configured such that first distance "X" is less than second distance "Y" such as shown in FIG. 4. It should also be understood that first distance "X" may be substantially equal to second distance "Y" as shown in FIG. 5. The particular configuration chosen may vary depending upon expected loads, modeled stresses and the like. It is also to be understood that reinforcement plate 140 may be formed from the same material employed to form each main leaf pack, second stage leaf pack and auxiliary stage leaf pack, or from another material depending upon selected engineering parameters.

The terms "about" and "substantially" are intended to include the degree of error associated with measurement of the particular quantity based upon the equipment available at the time of filing the application. For example, "about" and "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A leaf spring system comprising:
a main leaf pack including a main leaf spring having a first end provided with a first attachment member, a second end provided with a second attachment member and an intermediate portion including a first surface and a second opposing surface extending therebetween;
an auxiliary stage leaf pack arranged at the first surface of the main leaf spring, the auxiliary stage leaf pack including a first surface portion and a second, opposing surface portion;
a spacer arranged between the first surface of the main leaf spring and the second surface portion of the auxiliary stage leaf pack, the spacer including a first axial end, a second axial end and a central axis;
a reinforcement plate arranged at the first surface portion of the auxiliary stage leaf pack substantially aligned with the spacer, the reinforcement plate including a first end section, a second end section, and an intermediate section extending therebetween, at least one of the first end section and the second end section extending beyond a corresponding one of the first axial end and the second axial end;
a tip insert member positioned between the first surface portion of the auxiliary stage leaf pack and the reinforcement plate at one of the first end section and the second end section; and
another spacer arranged between the reinforcement plate and the first surface portion of the auxiliary stage leaf pack, the another spacer being spaced from the tip insert member.

2. The leaf spring system according to claim 1, wherein the tip insert member is formed from a non-metallic material.

3. The leaf spring system according to claim 2, wherein the non-metallic material comprises at least one of an elastomer and a plastic.

4. The leaf spring system according to claim 1, wherein each of the first end section and the second end section extend beyond a corresponding one of the first axial end and the second axial end.

5. The leaf spring system according to claim 1, wherein the reinforcement plate includes a pre-load.

6. The leaf spring system according to claim 1, wherein the reinforcement plate is formed from a metallic material.

7. The leaf spring system according to claim 1, further comprising: a second stage leaf pack arranged at the second surface of the main leaf pack.

8. The leaf spring system according to claim 1, wherein the main leaf pack includes at least two leaf members and the auxiliary stage leaf pack includes at least two auxiliary leaf members.

9. A vehicle comprising:
a frame; and
a leaf spring system mounted to the frame, the leaf spring system comprising:
a main leaf pack including a main leaf spring having a first end provided with a first attachment member, a second end provided with a second attachment member and an intermediate portion including a first surface and a second opposing surface extending therebetween;
an auxiliary stage leaf pack arranged at the first surface of the main leaf spring, the auxiliary stage leaf pack including a first surface portion and a second, opposing surface portion;
a spacer arranged between the first surface of the main leaf spring and the second surface portion of the auxiliary stage leaf pack, the spacer including a first axial end and a second axial end;
a reinforcement plate arranged at the first surface portion of the auxiliary stage leaf pack substantially aligned with the spacer, the reinforcement plate including a first end section, a second end section, and an intermediate section extending therebetween, at least one of the first end section and the second end section extending beyond a corresponding one of the first axial end and the second axial end;

a tip insert member positioned between the first surface portion of the auxiliary stage leaf pack and the reinforcement plate at one of the first end section and the second end section; and another spacer arranged between the reinforcement plate and the first surface portion of the auxiliary stage leaf pack, the another spacer being spaced from the tip insert member.

10. The vehicle according to claim 9, wherein the tip insert member is formed from a non-metallic material.

11. The vehicle according to claim 10, wherein the non-metallic material comprises at least one of an elastomer and a plastic.

12. The vehicle according to claim 9, wherein each of the first end section and the second end section extend beyond a corresponding one of the first axial end and the second axial end.

13. The vehicle according to claim 9, wherein the reinforcement plate includes a pre-load.

14. The vehicle according to claim 9, further comprising: a second stage leaf pack arranged at the second surface of the main leaf pack.

15. The vehicle according to claim 9, wherein the main leaf pack includes at least two leaf members and the auxiliary stage leaf pack includes at least two auxiliary leaf members.

* * * * *